Oct. 29, 1935. A. B. BELL 2,018,828
RECLINING SEAT
Filed July 7, 1933 3 Sheets-Sheet 1

INVENTOR
Alfred B. Bell
BY
Henry Van Arsdale
ATTORNEY.

Oct. 29, 1935.  A. B. BELL  2,018,828
RECLINING SEAT
Filed July 7, 1933    3 Sheets-Sheet 2
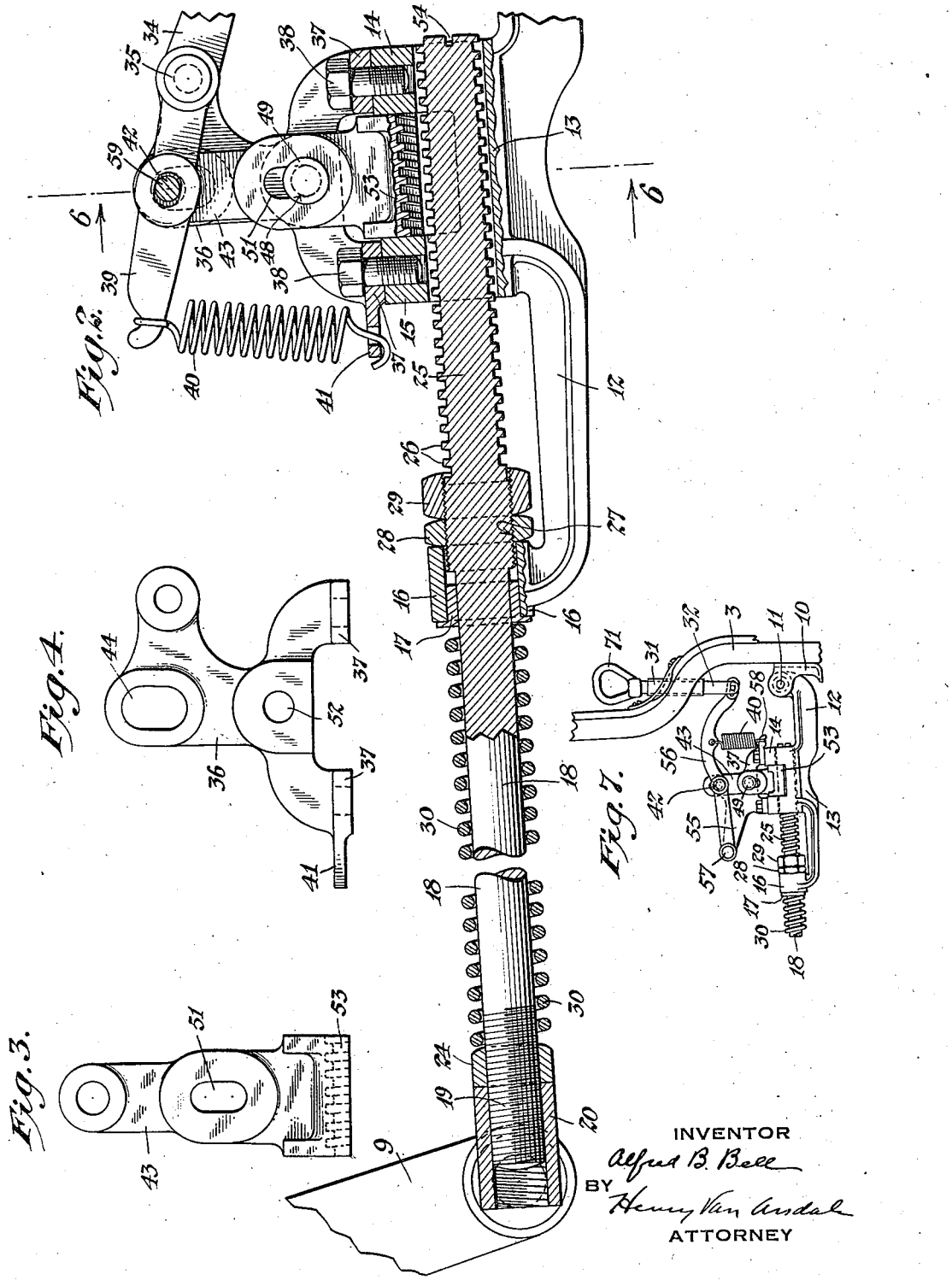

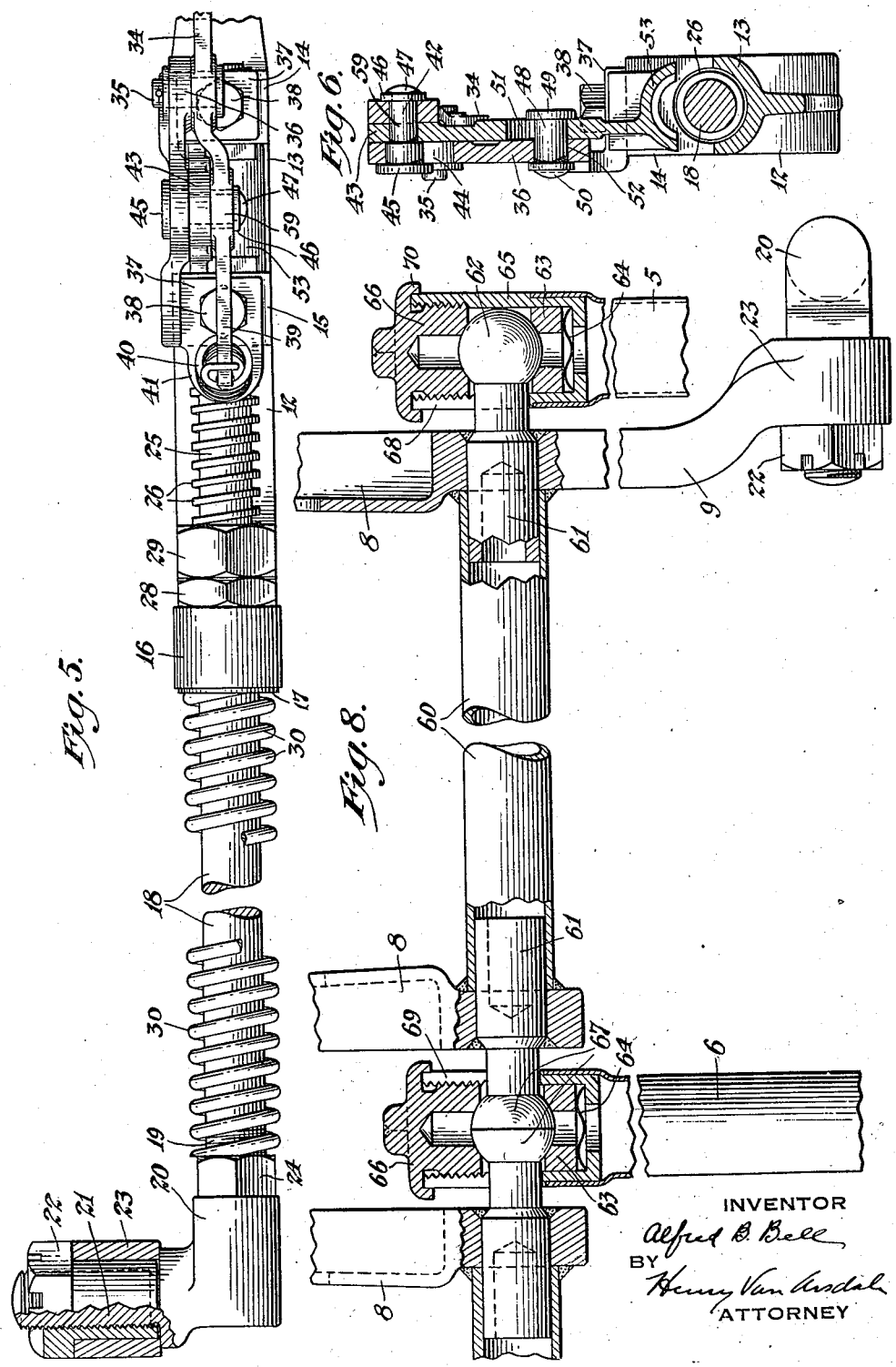

Patented Oct. 29, 1935

2,018,828

UNITED STATES PATENT OFFICE 2,018,828

RECLINING SEAT

Alfred B. Bell, Philadelphia, Pa., assignor, by mesne assignments, to Heywood-Wakefield Company, Gardner, Mass., a corporation of Massachusetts Application July 7, 1933, Serial No. 679,315

8 Claims. (Cl. 155—163)

This invention relates to reclining seats and more particularly to reclining seats adapted for use in railway coaches, buses, and tram cars.

In reclining seats not only for steam railway seating but also for autobus seating, simplicity of construction and operation, lightness of weight, maximum seating area and comfort, as well as sturdiness and durability are greatly desired, and one of the principal objects of this invention is to provide a seat adaptable for either steam railway seating or bus seating and having these characteristics.

It is well known that railway seats and bus seats are subjected to a great amount of vibration and shaking, as well as severe shocks and strains during travel, and another object of this invention is to provide a seat of the character described and one which is very free of rattle and vibration; and one in which lost motion between its parts is avoided, and thus avoiding noise and wear.

A further object of this invention is to provide a seat of the character described and one which is adaptable for use as either a stationary seat or as a rotating seat.

A further object of this invention is to provide a seat of the character described and one in which the seat back may be adjusted into a great number of different angles, and a seat in which the adjustment of the angle of the back may be made very readily, easily and conveniently by an occupant of the seat.

Another object of this invention is to provide a seat of the character described and one in which the seat back or the two backs of a double seat are so pivotally mounted on the seat frame as to be free of rattle and to avoid binding or hindrance to adjustment even though the chair is mounted on an uneven floor or in a strained position; and a further object of this invention is to provide a back mounting which permits of the easy removal of the back for repair or otherwise, and permits easy replacement of the back for reassembly, and in the case of a double seat permitting the removal or replacement of either back of the pair without disturbing the other back.

Other objects of this invention will be in part obvious and in part pointed out hereinafter.

In accordance with this invention the inclination of the pivoted seat back is controlled by a positioning member which at its rear end is pivotally connected to the seat back and at its forward end is shiftably carried in a bracket swingably mounted on the seat frame, so that the inclination of the seat back corresponds with the shifted positions of the positioning member relatively to the swinging bracket. Means are provided for normally maintaining the seat back in extreme elevation and the positioning member in the corresponding extreme position on the bracket. Means are provided on the seat frame for locking the positioning member against movement on the bracket, there being an operating member conveniently accessible to an occupant, whereby the locking member may be released from the positioning member, thus allowing adjustment of the inclination of the seat back. Means are provided for limiting the extent of movement permitted the positioning member and the positioning member is adapted to be locked in any one of a great many different intermediate positions. Other aspects and details of the invention will be pointed out and others will be made apparent in the description of an illustrative embodiment of this invention which will be set forth hereinafter.

In order that this invention may be more clearly understood, attention is hereby directed to the drawings forming a part of this invention and illustrating certain possible embodiments of this invention and in which:—

Fig. 2 is an enlarged side view of a portion of the reclining back operating mechanism, certain parts being broken away and others shown in section.

Fig. 3 is a side view of the lock nut member of the locking means.

Fig. 4 is a side view of the bracket upon which the lock nut is mounted.

Fig. 5 is a top view of a portion of the reclining back operating mechanism, certain parts being broken away and others shown in section.

Fig. 6 is a sectional view thereof and is taken on the line 6—6 of Fig. 2.

Fig. 7 is a side view of an alternate form of operating mechanism, and associate parts, some shown in fragment; and, Fig. 8 is a view showing the details of the pivot mounting of a pair of backs of a double seat, certain parts being shown in fragment and others shown in section.

Similar reference characters refer to similar parts throughout the several views of the drawings.

Figure 1:
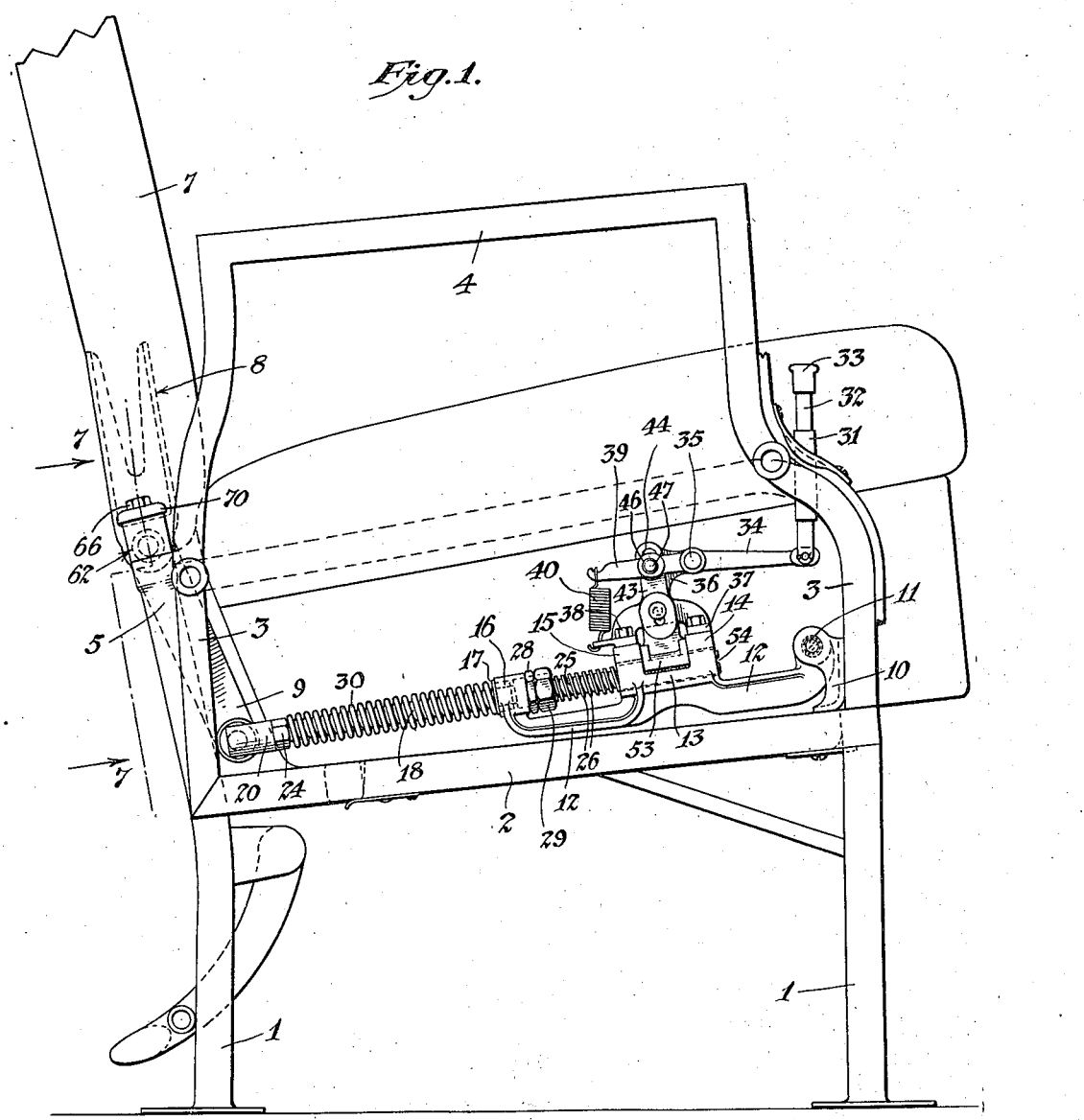
Fig. 1 is a side view of a seat embodying this invention with the end plate removed to show the reclining back operating mechanism.

In the illustrative embodiment shown in the drawings the seat is of the stationary type having a frame including legs 1 supporting a cushion frame 2 and upwardly extending frame members 3, serving as supports for arm rests 4. The frame also includes end posts or brackets 5 and a center post or bracket 6, which pivotally support the two backs 7 of a double seat. Each back is supported by and between two supporting arms 8 and one of these, preferably the one toward the end of the seat, has a downwardly extending lever arm 9 to which the reclining back operating mechanism is connected. It is to be understood that the seat may be of the rotating type, in which case the cushion-supporting frame 2 would be mounted to rotate on a suitable base or pedestal, and also that the seat may be a single seat instead of the double type referred to.

Secured to the side frame at its front is a bracket 10 having a pin 11 on which is swingably carried the forward end of an elongated bracket 12 which extends toward the rear of the seat. At its center this bracket has a bearing portion consisting of a continuous half round lower bearing portion 13 and two complementary upper bearing portions 14 and 15 which are spaced from each other. At the rear end of bracket 12 is an annular bearing portion 16 enclosing a loose ferrule 17.

The positioning member of the reclining back operating mechanism consists of a rod or shaft 18 which at its rear end 19 is in adjustable threaded engagement with a nut 20 mounted on the back lever 9 so as to swing on an axis perpendicular to its bore. As shown in Fig. 5 nut 20 has a threaded extension 21 extending at right angles to its bore and engaged by a threaded sleeve nut 22, the extension 21 and sleeve nut 22 extending through a bearing portion 23 of the lever 9 from opposite directions and having shoulders abutting the portion 23 from opposite sides. Nut 22 may be held in position by means of a cotter pin or other usual means. A jam nut 24 is provided on the threaded portion 19 of shaft 18 adjacent the nut 20. The forward end 25 slidably seats in the center bearing portion of the swinging bracket 12, the surface of this portion 25 being in the form of a square thread. A portion of the surface of shaft 18 from the rear end of the helical thread 26 and entering some distance into the bearing portion 16 of the bracket 12 is provided with a fine thread 27, and is here provided with a nut 28 adapted to strike against the forward edge of bearing portion 16. A lock nut 29 is also provided which is adapted to strike the center bearing portion of the bracket when the shaft 18 is shifted to its extreme forward position in the bracket. Nuts 28 and 29 thus serve as stops which limit the extent of the forward and rear movement permited to shaft 18. A smooth portion of shaft 18 slidably extends through the ferrule 17. A coil spring 30 encircling shaft 18 bears at its rear end against the lock nut 24 and at its forward end against the head of the ferrule 17, thus tending to maintain the shaft 18 in its most rearward position on the bracket 12, and the seat back in its most elevated position.

A bearing member or tube 31 is mounted at the one side of the seat frame at the front. This tube houses a plunger 32 having a knob 33 within easy reach of an occupant of the seat. The lower end of plunger 32 is pivotally connected with a lever 34 which is pivoted on a pin 35 carried on a bracket 36 which has a bifurcated base 37 resting and secured as by bolts 38 to the two bearing portions 14 and 15 of bracket 12.

The upper end of a locking member 43 is disposed between bracket 36 and lever 39 and a pin 42 has an enlarged shank portion seating in a slot 44 in bracket 36 and extends through a perforation in locking member 43 and through a slot 59 in lever 34. Pin 42 has a head 45 overlapping bracket 36 and a washer 46 and head 47 overlapping lever 34. Slot 59 permits the necessary play between rocking lever 34 and vertically moving locking member 43.

The locking member 43 is further steadied and guided by means of a pin 48 which is headed at both ends as at 49 and 50 and extends through a slot 51 in the locking member and a perforation 52 in the bracket 36.

The lower end of locking member 43 is in the form a half nut 53 and approximately fills the space between the bearing portions 14 and 15 of bracket 12. The threads of this portion 53 fit between the threads of the threaded portion 25 of the positioning member 18 and spring 40 normally holds this locking member in such engagement with shaft portion 25 that the shaft cannot move in the bracket 12. When, however, plunger 32 is depressed the locking member is disengaged from shaft 18 and the shaft is free to shift in the bracket, thus permitting corresponding change in the inclination of the seat back.

The initial inclination of the seat back, that is, its most vertical position, may be adjusted by loosening the lock nut 24, disengaging the locking member 43, and rotating the shaft 18 in one direction or the other to screw the nut 20 inwardly or outwardly of the shaft 18. Turning the shaft 18 so that nut 20 travels further on the shaft will lower the inclination of the seat back and turning shaft 18 in the opposite direction will raise the initial inclination of the seat back. To facilitate this operation the forward end of shaft 18 is provided with a slot 54 adapted to receive the end of a screwdriver or other suitable implement. When this initial adjustment has been made lock nut 24 is tightened.

The helical threads 26 of shaft portion 25 may be initially brought into proper relation with the threads of the locking portion 53 at any time by loosening the lock nut 29 and then turning the nut 28 either one way or the other on the shaft 18, and when the adjustment has been made accurately lock nut 29 is again tightened against the nut 28.

If desired, the mechanism can be arranged to be released by the occupant pulling upwardly on plunger 32 instead of depressing the plunger. An alternate operating mechanism of the pull type is shown in Fig. 7. Instead of providing a bracket, such as 36, which extends toward the front of the seat, the bracket 55 extends toward the rear of the seat, and a lever 56 is pivoted at its front end to the lower end of plunger 32 and is pivoted at its rear end on a pin 57 carried on bracket 55. Lever 56 carries the pin 42 which engages the locking member 43 and spring 40 engages lever 56 intermediate pin 42 and plunger 32 and at its lower end engages an ear 58 on the front of the bracket. To permit plunger 32 to be pulled up easily by an occupant of the seat it may be provided at its upper end with a suitable handle 71. By pulling handle 71 up lever 56 and the locking member 43 is raised and the half nut member 53 is disengaged from the threads 25 of the shaft 18, and when handle 71 is released spring 40 brings the parts back into locking positions.

The improved manner of mounting the seat backs is shown best in Fig. 8.

A tubular cross-member 60 extends between and is secured as by welding to the opposite end standards 8 of the back. At each end of the back a member 61 seats in the standard 8 and tube 60 and has an end in the form of a ball 62 protruding outside of the standard 8. This ball 62 seats between a lower half bearing 63 floating on a corrugated spring 64 resting on the bottom of a bearing housing 65 supported on the upper end of post or frame member 5. The upper half bearing 66 for the ball 62 is adjustably threaded into the top of the bearing housing 65. If the seat has a single back a mounting similar to that just described is provided at each end of the seat. When, however, the seat is a double seat having a pair of independent backs the construction is modified at the center and instead of having a complete ball formed by the protruding of the member 61, the end of this member is in the shape of a half ball 67, so that at the center of the seat the half balls 67 of both seats occupy the same space that would be occupied by a complete ball. The simplicity and ease with which backs so mounted may be removed and replaced is apparent. To mount a back on the posts it is merely necessary to lower the ball 62 and half ball 67 into the housings 65 which are slotted as at 68 and 69 for the purpose, screw the bearing portions 66 into the housings 65 and screw the rear end shaft 18 of the reclining back operating mechanism into the nut 20. To remove the back, this procedure is reversed. Due to the half ball arrangement at the center of the assembly, each one of a pair of seat backs may be removed and replaced without disturbing the other back of the pair.

It will be noted that the ball and socket manner of mounting the seat backs avoids any conditions which would be apt to cause rattle, and there is no liklihood of any binding effect, even though the chair should be mounted on an uneven floor or in a strained position. By having the lower half bearing floatingly mounted on a spring, wear is compensated for and also vertical and side play is eliminated, thus avoiding rattle and vibration from such cause.

To avoid any possibility of the bearing housings 65 expanding under strains, since they either have one slot or two slots to permit entry of the balls, the upper half bearings 66 are preferably provided with flanges 70 which engage about the outside of the upper edge of the housings. These flanges thus prevent any possible expansion of the housings. It is also possible to shim these bearings to take up wear or variations in machining and thus eliminate any lost motion and attendant rattle or vibration.

It is evident from the above that an occupant desiring to lower the inclination of the back merely needs to displace the plunger 32 and by leaning against the back bring it to the desired inclination, and then release the plunger 32, whereupon the locking portion 53 will automatically engage the threads 26 of the positioning member and firmly hold the seat back in the adjusted position until the plunger 32 is again depressed. To restore the seat back to raised position it is merely necessary for the occupant to displace the plunger 32 and allow the seat back to be raised by the spring 30. The inclination of the seat back throughout the entire range of its adjustment may be varied as little as the variation corresponding to movement of the shaft 18 for a distance equal to one thread 26.

By reason of the fact that the blocks 14 and 15 abut the half nut 53 on opposite ends the pins 42 and 48 are relieved of all stress transmitted through shaft 18. The thrust of spring 30 on member 53 is taken by block 15 and the thrust on member 53 resulting from pressure on the seat back is taken by block 14. Preferably member 53 abuts the blocks closely enough to prevent rattle between these parts, but at the same time is freely slidable vertically therebetween.

It is also apparent from the above that rattle and vibration is prevented throughout. The reclining back operating mechanism is easy and convenient to operate, and the inclination of the seat back readily and easily adjusted. The entire construction is extremely simple, light in weight, and effective while at the same time extremely strong and durable. All parts are readily and easily replaceable. There are also many other advantages and improvements which are self-evident to those familiar with the art.

As many changes could be made in the above construction and as many apparently widely different embodiments of this invention could be made without departing from the scope thereof, it is to be understood that all matter contained in the above description or shown in the accompanying drawings be interpreted as illustrative and not in a limiting sense.

What I claim is:

1. In a seat of the character described, a seat frame, a back swingably mounted on said frame to rock on a horizontal axis, a bracket swingably mounted on the frame to rock on a horizontal axis, a back positioning member slidably carried on said bracket and connected to the seat back and having a circumferentially threaded rack portion, means, including a locking member having half-threads complementary to and engaging the threaded rack of the positioning member, for holding the positioning member in adjusted position on the bracket and the seat back in corresponding position of inclination, means, including an operating member accessible to an occupant of the seat, whereby the locking member may be disengaged from the positioning member to permit adjustment of the positioning member on the bracket and a corresponding adjustment of the inclination of the seat back, and means, including a stop member adjustably carried on the positioning member and co-acting with the bracket, whereby the positioning member may be shifted relatively to the bracket and said threaded rack and half-threads may be brought into co-acting alignment when the positioning member is in an extreme position on the bracket.

2. In a reclining seat of the character described, a seat frame, a seat back swingably mounted on the frame, an elongated bracket swingably mounted at one end on the frame, a shaft slidably shiftable in said bracket and extending rearwardly therefrom and having its rear pivotally connected to the seat back, whereby the inclination of the seat back is determined by the shifted position of the shaft in the bracket, said bracket having portions encircling said shaft at three places spaced from each other, a stop device mounted on the shaft intermediate two of said bracket portions and coacting therewith, determining the shifting range of the shaft on the bracket, the portion of the shaft shiftable in the two foremost bracket portions having a thread therealong, half nut member mounted on the bracket between the two foremost bracket portions and having half threads complementary to the threads on said shaft portion and shiftable on said bracket transversely of the shaft into and out of engagement with the threads thereof, and releasing means including a manually operable plunger mounted on the seat frame and connected to the locking member whereby said locking member may be disengaged from the shaft to release the shaft for shifting movement on the bracket.

3. In a reclining seat of the character described, a seat frame, a seat back swingable on the frame, an elongated bracket swingably mounted at one end on the frame, a shaft slidably shiftable in said bracket and extending rearwardly therefrom and having its rear end pivotally connected to the seat back, whereby the inclination of the seat back is determined by the shifted position of the shaft in the bracket, said bracket having portions encircling said shaft at three places spaced from each other, a stop device mounted on the shaft intermediate two of said bracket portions and coacting therewith, determining the shifting range of the shaft on the bracket, a compression spring encircling the shaft intermediate the rearmost bracket portion and the seat back and coacting with the bracket and back and adapted to move and maintain the shaft at the rearmost shifted position on the bracket and the seat back raised accordingly, the portion of the shaft shiftable in the two foremost bracket portions having a thread therealong, a half nut member mounted on the bracket between the two foremost bracket portions and having half threads complementary to the threads on said shaft portion, and shiftable on said bracket transversely of the shaft into and out of engagement with the threads thereof, a lever pivotally mounted on the bracket and connected to the half nut member whereby the half nut member may be shifted on the bracket, a spring connected to the lever and bracket tending to maintain the half nut member engaged with the shaft threads to lock the shaft against shifting movement on the bracket, and a plunger mounted on the seat frame and connected to said lever, whereby said lever may be rocked to disengage the half nut member from the shaft and release the shaft for shifting movement on the bracket, the rear end of said shaft having an adjustable threaded engagement with a nut member connected to the seat back whereby initial adjustment of the seat back inclination may be varied by rotating the shaft in said nut member.

4. Seat back supporting means for a seat having a seat frame and a seat back, said means including, in combination, bearing sockets supported on the frame at each end of the back, upper and lower complementary bearing members housed in each socket, a stud extending outwardly from each end of the seat back and having a ball portion at its end seating between the bearing members in the adjacent bearing socket, each bearing socket having a side slit open at its upper end and the shank of each stud being slidable into the slit to enter its ball portion into the bearing socket from its end and to seat the ball portion on the lower bearing member in the socket, and a part on each upper bearing member encircling the upper edge of each bearing socket preventing expansion of the bearing socket at the slit therein.

5. Seat back supporting means for a double seat, including, a seat frame, a pair of seat backs arranged end to end on the frame, and means supporting each back on the frame to swing separately on a horizontal axis, said means including, in combination, a bearing socket supported on the frame at the outer end of each back and a center bearing socket supported on the frame between said backs, complementary bearing members housed in each socket, a stud extending outwardly from the outer end of each seat back and having a ball portion seating between the bearing members of the adjacent bearing socket, a stud extending from the inner end of each seat back and having a half-ball shaped end seating between the bearing members of the center bearing socket, the flat surfaces of said half-ball shaped stud ends being contiguous at the center of the bearing.

6. Seat back supporting means including, a seat frame, a seat back, and a ball and socket bearing for supporting the seat back on the seat frame to swing on a horizontal axis, said bearing including a stud having a ball end secured to each end of the seat back, a socket supported on the seat frame and having an interiorly threaded open upper end and a side slit open at its upper end along which the shank of the stud may be slid, a lower bearing member in the socket, a spring in the socket on which the lower bearing member rests floatingly, an upper bearing member having an exteriorly threaded portion screwed into the socket and having a confining flange seating about the upper edge of the socket, said ball end of the stud being rotatably held between the upper and lower bearing members.

7. In a seat of the character described, a seat frame, a back swingably mounted on the frame to rock on a horizontal axis, an elongated bracket pivotally mounted at its front end on the frame to rock on a horizontal axis, a back positioning member shiftably mounted on said bracket to rock therewith and connected to the seat back, whereby the inclination of said back corresponds with the shifted positions of the positioning member on the bracket, spring means whereby the seat back is moved to and normally maintained in an extreme elevated position and the positioning member shifted to and held in the corresponding extreme shifted position on the bracket, said positioning member having a rack portion, means including a co-acting locking member mounted on the bracket to rock therewith and adapted to engage said rack portion to lock the positioning member in adjusted shifted position on the bracket and to hold the seat back in correspondingly inclined position, thrust abutments on the bracket at opposite ends of and abutting the locking member longitudinally of the positioning member, said positioning member having a threaded adjustment portion and a nut thereon engaging said bracket whereby the extreme shifted position of the positioning member on the bracket may be varied and the said rack brought into co-acting alignment with the locking member, and operating means for operating the locking member to release the positioning member for adjustment of the seat back and to hold the positioning member and back in adjusted position.

8. In a seat of the character described, a seat frame, a back swingably mounted on said frame to rock on a horizontal axis, an elongated bracket swingably mounted at its front end on the frame to rock on a horizontal axis, a back positioning member slidably carried on said bracket and connected to the seat back and having approximately square-cut arcuate rack ridges and grooves, means, including a locking member having arcuate locking ridges and grooves complementary to and intermeshing with the rack ridges and grooves of the positioning member, for holding the positioning member in adjusted position on the bracket and the seat back in corresponding position of inclination, means normally holding said rack and locking ridges and grooves intermeshed, and means including an operating member accessible to an occupant of the seat, whereby the locking member may be moved independently of the bracket and disengaged from the positioning member to permit adjustment of the positioning member on the bracket and corresponding adjustment of the inclination of the seat back.

ALFRED B. BELL.